US010738976B1

(12) United States Patent
Chen et al.

(10) Patent No.: US 10,738,976 B1
(45) Date of Patent: Aug. 11, 2020

(54) LIGHTING DEVICE

(71) Applicants: Shanghai Sansi Electronic Engineering Co., Ltd., Shanghai (CN); Sansi Optoelectronics Technology (Shanghai) Co., Ltd., Shanghai (CN); Shanghai Sansi Technology Co. Ltd., Shanghai (CN); Jiashan Sansi Optoelectronic Technology Co. Ltd., Zhejiang (CN)

(72) Inventors: Bishou Chen, Shanghai (CN); Peng Wang, Shanghai (CN); Xiaoliang He, Shanghai (CN); Li Xu, Shanghai (CN)

(73) Assignees: Shanghai Sansi Electronic Engineering Co., Ltd., Shanghai (CN); Sansi Optoelectronics Technology (Shanghai) Co., Ltd., Shanghai (CN); Shanghai Sansi Technology Co. Ltd., Shanghai (CN); Jiashan Sansi Optoelectronics Technology Co., Ltd., Zhejiang (CN)

(*) Notice: Subject to any disclaimer, the term of this patent is extended or adjusted under 35 U.S.C. 154(b) by 0 days.

(21) Appl. No.: 16/512,392

(22) Filed: Jul. 16, 2019

Related U.S. Application Data

(63) Continuation-in-part of application No. 16/066,532, filed as application No. PCT/CN2017/107938 on Oct. 27, 2017.

(30) Foreign Application Priority Data

Mar. 21, 2019 (CN) .......................... 2019 1 02181517
Mar. 21, 2019 (CN) ................... 2019 2 03689688 U

(51) Int. Cl.
*F21V 17/00* (2006.01)
*F21V 23/06* (2006.01)
(Continued)

(52) U.S. Cl.
CPC ............ *F21V 17/002* (2013.01); *A01G 7/045* (2013.01); *F21V 5/04* (2013.01); *F21V 17/108* (2013.01);
(Continued)

(58) Field of Classification Search
CPC ........ F21V 17/002; F21V 23/002; F21V 5/04; F21V 23/023; F21V 23/06; F21V 17/108; F21V 17/12; F21V 21/03; A01G 7/045
See application file for complete search history.

(56) References Cited

U.S. PATENT DOCUMENTS 9,644,828 B1 * 5/2017 May ...................... F21V 23/005
10,386,058 B1 * 8/2019 Cattoni ................... F21S 8/061
(Continued)

*Primary Examiner* — Donald L Raleigh

(57) ABSTRACT

A lighting device includes: a bearing member, provided with a circuit switching component, wherein the circuit switching component is connected to an external power supply, and is provided with at least one first plug portion; and at least one light source component, comprising: a housing, provided with a first accommodation portion and a second accommodation portion; one or more light source units, each light source unit has one or more pairs of power supply pins; a drive circuit component, comprising a second plug portion, the drive circuit component is used for switching the external power supply into supply power to the light source unit; and a conductive member, provided with through holes for inserting the power supply pins, wherein the conductive member is in conductive contact with each electrical connection pin.

17 Claims, 4 Drawing Sheets

(51) Int. Cl.
  *F21V 23/02* (2006.01)
  *F21V 17/12* (2006.01)
  *A01G 7/04* (2006.01)
  *F21V 23/00* (2015.01)
  *F21V 5/04* (2006.01)
  *F21V 17/10* (2006.01)
  *F21V 21/03* (2006.01)

(52) U.S. Cl.
  CPC .............. *F21V 17/12* (2013.01); *F21V 21/03* (2013.01); *F21V 23/002* (2013.01); *F21V 23/023* (2013.01); *F21V 23/06* (2013.01)

(56) References Cited

U.S. PATENT DOCUMENTS

| | | | | |
|---|---|---|---|---|
| 2008/0278941 | A1* | 11/2008 | Logan | F21S 4/28 |
| | | | | 362/234 |
| 2011/0157891 | A1* | 6/2011 | Davis | B29C 45/14467 |
| | | | | 362/244 |
| 2011/0285314 | A1* | 11/2011 | Carney | E04B 9/006 |
| | | | | 315/294 |
| 2013/0271981 | A1* | 10/2013 | Hussell | F21V 7/00 |
| | | | | 362/235 |
| 2015/0036387 | A1* | 2/2015 | Myers | F21V 23/06 |
| | | | | 362/646 |
| 2015/0223301 | A1* | 8/2015 | Maa | F21V 23/0442 |
| | | | | 315/112 |
| 2016/0033098 | A1* | 2/2016 | Bergman | H02G 3/20 |
| | | | | 362/418 |
| 2018/0017238 | A1* | 1/2018 | Volpato | F21V 23/002 |
| 2019/0059237 | A1* | 2/2019 | Johnson | F21V 5/04 |

* cited by examiner

LIGHTING DEVICE

CROSS REFERENCES TO RELATED APPLICATION

This is a continuation-in-part application claiming benefits of priority to a pending U.S. patent application Ser. No. 16/066,532 filed on Oct. 27, 2017, which is a Sect. 371 National Stage of PCT International Application No. PCT/CN2017/107938 filed on Oct. 27, 2017 and claimed benefits of priority to Chinese Patent Application No. CN2017107921862 (entitled "Light Source Module and Lighting Device Using the Same", filed with CNIPA on Sep. 5, 2017), and Chinese Patent Application No. CN 2017211331740 (entitled "Light Source Module and Lighting Device Using the Same", filed with CNIPA on Sep. 5, 2017). The present application further claims benefits of priority to Chinese Patent Application No. CN 2019102181517, entitled "Light Device", filed with CNIPA on Mar. 21, 2019, and claims benefits of priority to Chinese Patent Application No. CN 2019203689688, entitled "Light Device", filed with CNIPA on Mar. 21, 2019. The contents of above applications are hereby incorporated herein by reference in their entirety for all purposes.

TECHNICAL FIELD

This disclosure relates to the field of lighting technology, and in particular, to a lighting device.

DESCRIPTION OF RELATED ARTS

In light source modules of current light-emitting diode (LED) lighting devices, a plurality of LED chips is generally provided on the same substrate. Once an LED chip is damaged, the whole light source module needs to be replaced. For a device such as plant growth lamp that needs to be configured with a plurality of light source modules, replacement is especially inconvenient.

SUMMARY OF THE PRESENT INVENTION

This disclosure provides a lighting device, comprising: a bearing member, provided with a circuit switching component, wherein the circuit switching component is connected to an external power supply, and is provided with at least one first plug portion; and at least one light source component, comprising: a housing, provided with a first accommodation portion and a second accommodation portion; one or more light source units, disposed in the first accommodation portion, wherein each light source unit has one or more pairs of power supply pins; a drive circuit component, disposed in the second accommodation portion and comprising a second plug portion, wherein the second plug portion is positioned with the first plug portion, the drive circuit component is used for switching the external power supply into supply power to the light source unit; and a conductive member, provided with through holes for inserting the power supply pins, wherein the conductive member is in conductive contact with each electrical connection pin, the conductive member is conductively connected to the drive circuit component so as to conductively connect to the second plug portion through the drive circuit component.

In an embodiment of this disclosure, the lighting device comprises at least one screw locking member, the screw locking member passes through at least one positioning hole provided in the housing, and is screw-locked to the connector.

In an embodiment of this disclosure, a third accommodation portion jointed with the conductive member through shape matching is formed in the housing.

In an embodiment of this disclosure, the circuit switching component is provided with a plurality of first plug portions along a length direction, the plurality of first plug portions is plugged in second plug portions of the plurality of light source components respectively.

In an embodiment of this disclosure, the length direction of the bearing member is the same as a length direction of the circuit switching component, and a fourth accommodation portion jointed with the circuit switching component through shape matching is disposed in the bearing member.

In an embodiment of this disclosure, the bearing member is provided with one or more suspending levers, or one or more pairs of suspending levers for suspension.

In an embodiment of this disclosure, the light source unit comprises: a support member, provided with a first positioning portion, the lighting device is disposed on the support member; a light source mounting member, provided with a second positioning portion, second positioning portion is jointed with the first positioning portion through shape matching, where the light source mounting member has a bearing surface for disposing a light source electronic component; and a lens member, covering the bearing surface and connected to the support member in a positioned manner.

In an embodiment of this disclosure, the lighting device comprises one or more pairs of power supply pins, where one end of each power supply pin is electrically connected to the light source electronic component, and the other end is exposed after passing through the support member and the light source mounting member to be exposed.

In an embodiment of this disclosure, the support member is provided with at least one first extension portion, the at least one first extension portion surround the first positioning portion, and extends t towards the lens member, and the light source mounting member is provided with at least one limiting portion to be correspondingly jointed with the at least one first extension portion in a one-to-one manner.

In an embodiment of this disclosure, the first extension portion is a convex body extending towards the lens member, and the limiting portion is a groove located on an outer surface of the light source mounting member and fitting with the convex body.

In an embodiment of this disclosure, the light source mounting member comprises: a main body; and at least two protruding structures disposed at intervals along the circumference of a lateral side of the main body, where the limiting portion is formed at a gap between the protruding structures.

In an embodiment of this disclosure, the lens member is provided with a second extension portion to be jointed with the limiting portion, and the first extension portion and the second extension portion are each jointed with a part of the limiting portion.

In an embodiment of this disclosure, the positioning connection is a clamping connection; the support member is provided with a first clamping portion; and the lens member is provided with a second clamping portion clamped with the first clamping portion.

In an embodiment of this disclosure, the first clamping portion is disposed at the first extension portion, and the second clamping portion is disposed at the second extension portion.

In an embodiment of this disclosure, the first clamping portion is a hook portion, the second clamping portion is a buckle portion, or the first clamping portion is a buckle portion,, the second clamping portion is a hook portion.

In an embodiment of this disclosure, clamping between the first clamping portion and the second clamping portion is one of the following: 1) the first clamping portion is a hook portion located on the circumference of the support member and protruding outwards to clamp with the second clamping portion on an external side thereof; and 2) the first clamping portion comprises a hook portion located on the circumference of the support member and protruding inwards, and a stopping portion disposed opposite to the hook portion, where a gap is formed between the hook portion and the stopping portion for the buckle portion to insert and clamp with the hook portion; and the gap has an adjustable width to limit the buckle portion within the gap.

In an embodiment of this disclosure, the lighting device is a plant growth lamp.

DETAILED DESCRIPTION OF THE PREFERRED EMBODIMENTS

Implementations of this disclosure are illustrated below through specific embodiments. Those skilled in the art can easily understand other advantages and efficacy of this disclosure according to the content disclosed in this specification. This disclosure can also be implemented or applied through other different specific implementations. Various modifications or variations can also be made on details in this specification based on different opinions and disclosures without departing from the spirit of this disclosure. It should be noted that, the embodiments in this disclosure and features in the embodiments can be combined with each other if no conflict occurs.

A light source module of a lighting device is usually designed to have an integral structure. When any one light source is damaged, the whole light source module needs to be replaced. In view of this, this disclosure provides a lighting device, in which each light source unit is designed to be an independent replaceable component.

It should be particularly noted that, the technical solution of this disclosure can be applied to a plant growth lamp, so that light source units in each light source component are replaceable while each light source component of the plant growth lamp can be replaced through plugging, thereby improving the service life of the plant growth lamp. Definitely, the lighting device according to this disclosure is applicable to other lamps, which is not limited to the plant growth lamp.

Figure 1:
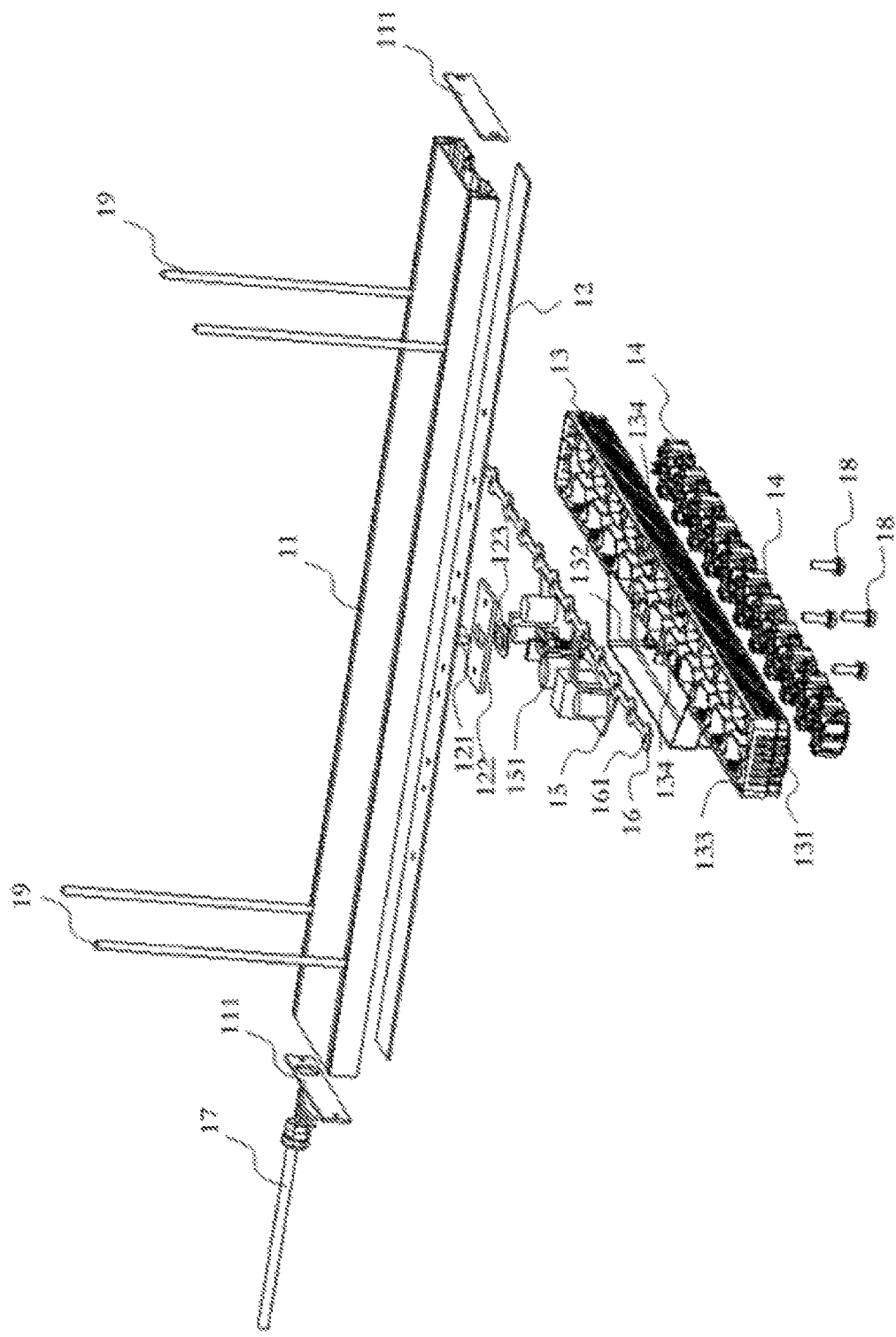
FIG. 1 is an exploded schematic diagram of a lighting device in an embodiment of this disclosure.

FIG. 1 is an exposed schematic diagram of a lighting device in an embodiment of this disclosure.

The lighting device includes: a bearing member 11, a circuit switching component 12, and at least one light source component.

The bearing member 11 is provided with the circuit switching component 12 for connection to an external power supply. In this embodiment, the bearing member 11 is a component made of, for example, an aluminum profile, and may be strip-shaped as shown in the figure. An accommodation space for disposing the circuit switching component 12 may be formed in the bearing member 11.

The accommodation space matches with the circuit switching component 12. For example, in this embodiment, the circuit switching component 12 is strip-shaped. Then, the accommodation space includes an accommodation portion, for example, a strip-shaped groove, arranged along a length direction of the bearing member 11 and fitting with the circuit switching component 12. The accommodation portion can accommodate and position the circuit switching component 12 within the bearing member 11.

In an embodiment, two ends of the bearing member 11 may be closed through caps 111. Optionally, one end of the bearing member 11 is connected to a power supply circuit 17 of the external power supply, such as a 220V alternating-current power supply circuit, and is electrically connected to the circuit switching component 12. The power supply circuit 17 is coupled to the circuit switching component 12.

The circuit switching component 12 may be a circuit made of a conductive material or a circuit on which a conductive material is laid. For example, the circuit switching component 12 may be made of a metal material, or the circuit switching component 12 is a substrate made of a PCB, a ceramic material, or the like, on which a conductive circuit (such as a printed copper foil circuit) is laid.

The circuit switching component 12 is provided with at least one first plug portion 121. The first plug portion 121 may be a plug or a socket, the first plug portion 121 has a conductor (such as a metal pin or metal jack) therein. The conductor is in conductive contact with the circuit switching component 12 (for example, the conductive contact is implemented through soldering).

The light source component includes: a housing 13, one or more light source units 14, a drive circuit component 15, and a conductive member 16.

A first accommodation portion 131 and a second accommodation portion 132 are formed in the housing 13.

The one or more light source units 14 are disposed in the first accommodation portion 131. In this embodiment, a plurality of light source units 14 is arranged one by one along a linear direction. Moreover, in this embodiment, each light source unit 14 is disposed upside down, and one or more pairs of power supply pins are led out from the tail thereof, so that a power supply can be connected to the light source unit to supply power. The light source unit 14 may include a light source electronic component (such as a light-emitting diode (LED)), which emits light after power is supplied.

Corresponding to each power supply pin of each light source unit 14, the conductive member 16 is provided with a through hole for inserting the power supply pin. The power supply pin inserted into the through hole is in conductive contact with the conductive member 16. The conductive member 16 may be made of a conductive material such as metal.

The conductive member 16 can be further electrically connected to the drive circuit component 15. The drive circuit component 15 is provided with a second plug portion 151 that is positioned and plugged with the first plug portion 121 in a conductive connection manner. The first plug portion 121 may be a male plug or a female socket, and the second plug portion 151 may be a female socket or a male plug correspondingly. When plugged together, the first plug portion 121 and the second plug portion 151 can be connected conductively. Then, the external power supply supplies power to the drive circuit component 15 through the circuit switching component. The drive circuit component 15 is used for converting alternating-current power of the external power supply into direct-current power (for example, DC 12V) for each light source unit 14. The drive circuit component 15 may include an AC-DC power supply conversion circuit, or include AC-DC and DC-DC power supply conversion circuits. The power supply output by the drive circuit component 15 is then transmitted, through the conductive member 16, to the power supply pins of the each light source unit 14 which pass through the conductive member 16, thereby supplying power to all the light source units 14.

Optionally, to enhance the firmness and water-proof performance of the joint between the first plug portion 121 and the second plug portion 151, the first plug portion 121 and the second plug portion 151 may be jointed through openings on a press plate 122 and a seal ring 123. Frictional forces between the first plug portion 121 and the seal ring 123 and between the second plug portion 151 and the seal ring 123 help improving the tightness of plugging between the first plug portion 121 and the second plug portion 151. The seal ring 123 can provide water-proof effectively on the press plate 122 and the circuit switching component 12, a fastening member (such as a screw) may penetrate a fastening hole, so that the press plate 122 and the circuit switching component 12 are fastened to each other, and therefore, the plugging between the first plug portion 121 and the second plug portion 151 is firmer.

It should be noted that, although a specific structure of a conductive connection of the second plug portion 151 with the drive circuit component 15 is not shown in the figure, those skilled in the art can understand that such a connection can be implemented through a wire, a joint of metal plug members, soldering, and other various manners. Therefore, although the manners are not shown in the figure, specific implementations thereof are not affected.

Figure 2:
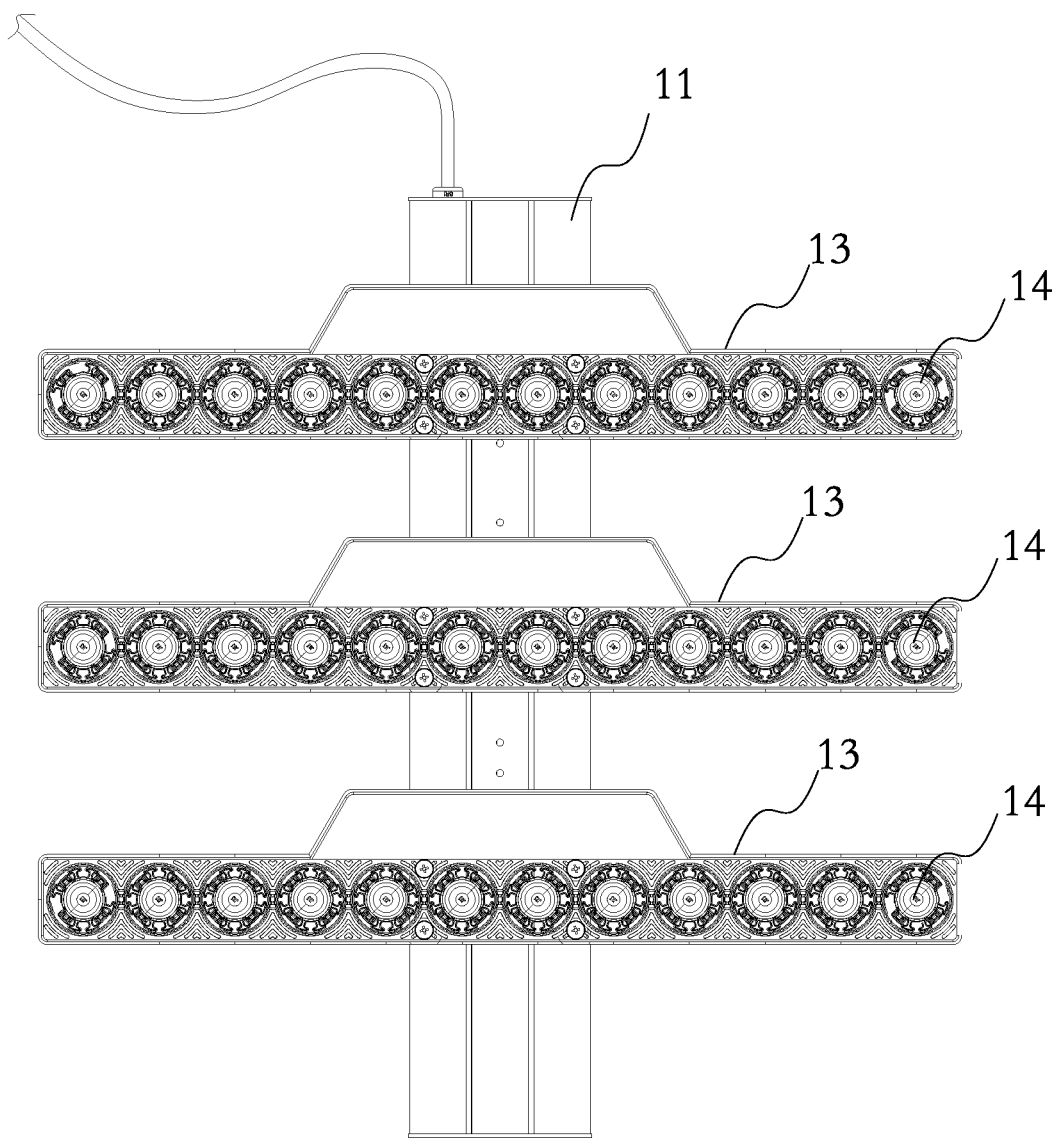
FIG. 2 is an assembled schematic diagram of a lighting device in an embodiment of this disclosure.

Similarly, in some embodiments, the circuit switching component 12 may be provided with a plurality of first plug portions 121 along a length direction thereof. Correspondingly, the first plug portions 121 can be plugged with second plug portions 151 of a plurality of light source components respectively, so that a plurality of light source components are mounted in the bearing member 11, to form the lighting device shown in FIG. 2. It can be seen from FIG. 2 that each of the mounted light source units 14 is arranged independently.

Optionally, a third accommodation portion 133 jointed with the conductive member 16 through shape matching is formed in the housing 13. In this embodiment, as can be seen from the figure, because the light source units 14 are arranged along a line (which is a straight line in this embodiment, and alternatively, may be a curve), the conductive member 16 is formed by connecting a plurality of straight line segments and circular faces arranged at intervals. Each circular face is provided with a number of through holes 161, the power supply pins of one light source unit 14 pass through the through holes 161 correspondingly. The third accommodation portion 133 is a groove matching with the conductive member 16, and is used for disposing the conductive member 16 therein and positioning the conductive member 16 transversely.

In this embodiment, optionally, the lighting device further includes a plurality of pairs of screw locking members 18, the screw locking members 18 penetrates at least one positioning hole 134 provided in the housing 13. The screw locking members 18 are screw-locked to the connector. The screw locking member 18 may be a screw or a bolt, the screw locking member 18 has a diameter matching with that of the positioning hole 134. After passing through the positioning hole 134, the screw locking member 18 may be jointed with a screw hole (not shown) on a lower surface of a carrier, so as to fasten the light source component to the carrier.

The plant growth lamp is generally suspended, to shine the plants downwards. Therefore, in this embodiment, the bearing member 11 is provided with one or more suspending levers 19, or one or more pairs of suspending levers 19 for suspension. Preferably, two pairs of suspending levers 19 may be provided as shown in FIG. 1, thereby hanging the lighting device in a balanced manner.

Figure 3:
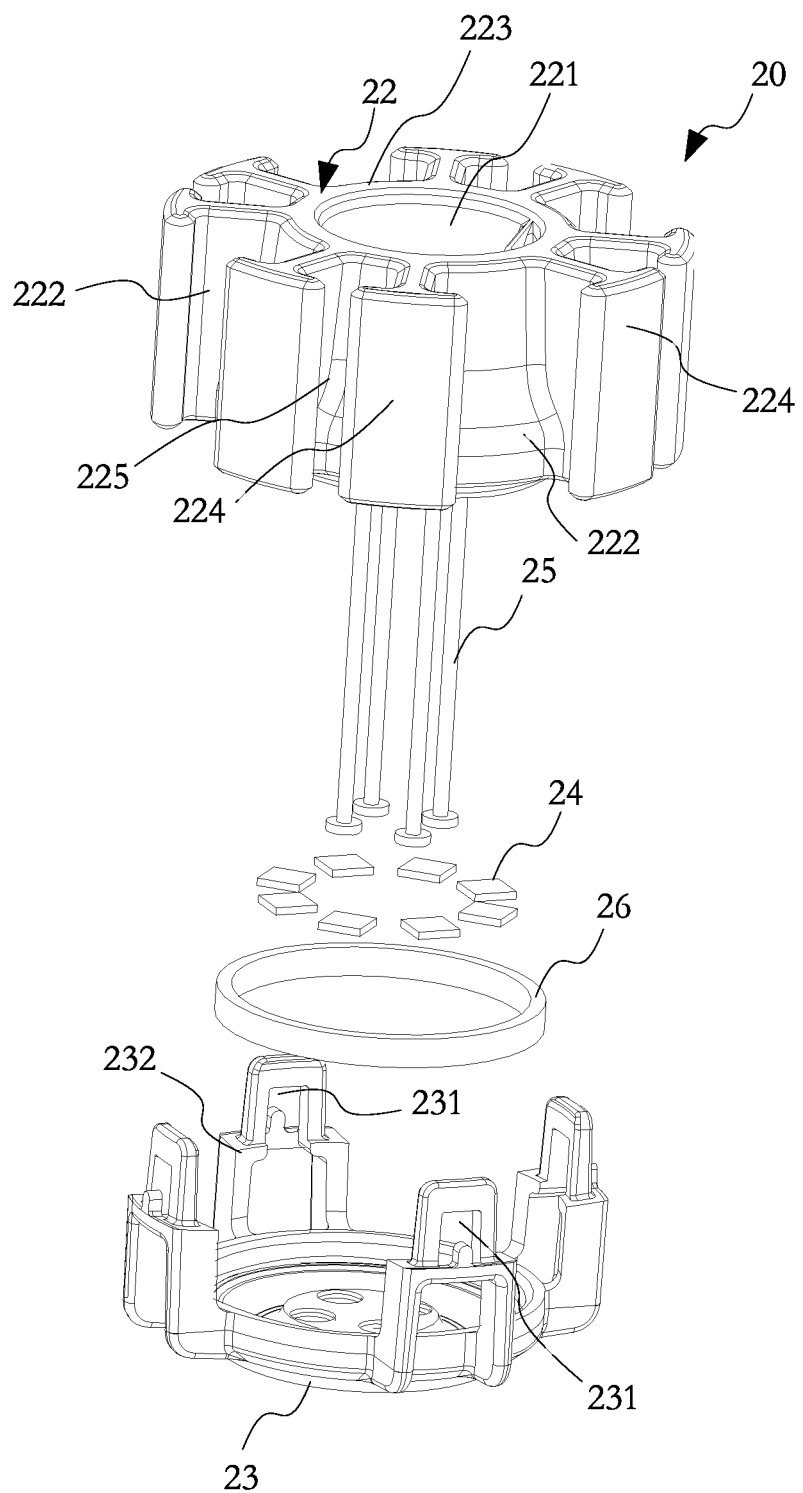
FIG. 3 is an exploded schematic diagram of a light source unit in an embodiment of this disclosure.

FIG. 3 is an exposed schematic diagram of the light source unit 20 in an embodiment of this disclosure.

The light source unit 20 includes: a support member 21, a light source mounting member 22, and a lens member 23.

Figure 4:
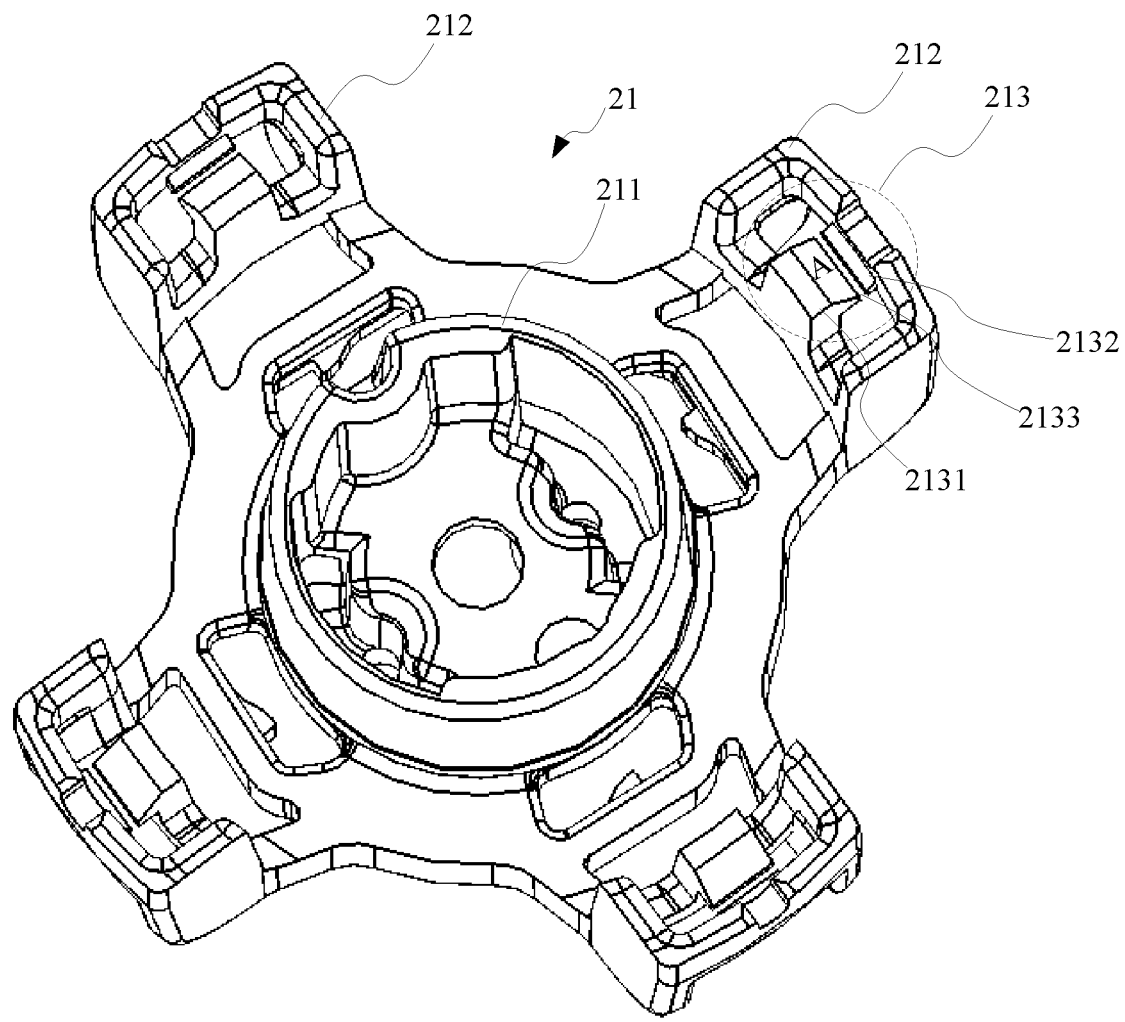
FIG. 4 is a schematic diagram of a support member in an embodiment of this disclosure.

Referring to FIG. 4, the support member 21 is shown. In FIG. 3, the support member 21 is disposed in the housing 13, and therefore is not shown.

The support member 21, the light source mounting member 22, and the lens member 23 may be coaxially disposed, and be assembled one by one.

The light source mounting member 22 may provide a bearing surface for disposing one or more light source electronic components 24, that is, LED chips or the like. Eight light source electronic components 24 are shown in this embodiment. The light source mounting member 22 may be made of, for example, a ceramic material. The bearing surface of the light source mounting member 22 may be provided with a plurality of through holes, the one or more pairs of power supply pins 25 penetrate the through holes. Two pairs of power supply pins 25 are shown in this embodiment. A conductive circuit may be laid on the bearing surface of the light source mounting member 22 through printing or by a circuit groove, so that the light source mounting member 22 can be conductively connected to each light source electronic components 24 and each power supply pins 25.

As shown in FIG. 4, on a side facing the light source mounting member 22, the support member 21 is provided with a first positioning portion 211, at least one first extension portion 212 is disposed around the first positioning portion 211. The light source mounting member 22 has a second positioning portion 221, which is matched the first positioning portion 211 through form-fitting, and at least one limiting portion 222, which is matched the at least one first extension portion 212 in a one-to-one manner.

The first positioning portion 211 shown in FIG. 4 is an annular convex portion, and the second positioning portion 221 is a fitting circular concave portion.

Optionally, a protrusion may be disposed in the second positioning portion 221; correspondingly, the first positioning portion 211 is provided with a notch that fits with the protrusion. The jointed protrusion and notch can achieve fool-proofing and positioning (transverse movement positioning and rotation limitation in some directions).

The combination of the first extension portion 212 and the limiting portion 222 can restrict the transverse movement and rotation of the light source mounting member 22. However, it should be noted that, in other embodiments, the first extension portion 212 and the limiting portion 222 are not mandatory. For example, it is possible to achieve transverse positioning through the combination of the first positioning portion 211 and the second positioning portion 221 (in the case where dimensions of the first positioning portion 211 and the second positioning portion 221 shown in the figure fit with each other), and the rotation of the light source mounting member 22 may be limited by using a concave-convex fitting structure between the light source mounting member 22 and the support member 21 (the structure may be between the first positioning portion 211 and the second positioning portion 221). This can also achieve the positioning effect for the light source mounting member 22 as the combination of the first extension portion 212 and the limiting portion 222. For example, the first positioning portion 211 and the second positioning portion 221 are a concave portion and a convex portion with non-circular cross sections jointed together, such as square cross sections or cross sections in other shapes.

It should be noted that, although the first positioning portion 211 is a convex portion and the second positioning portion 221 is a concave portion in this embodiment, the first positioning portion 211 and the second positioning portion 221 may be interchanged in other embodiments, and are not limited to this embodiment.

Moreover, as shown in FIG. 3, in this embodiment, the light source mounting member 22 includes: a main body 223 and at least two protruding structures 224. The main body 223 is cylindrical in this embodiment. In other embodiments, main body 223 may be in other shapes, such as a cuboid. The main body 223 may be provided with the bearing surface for disposing the light source electronic component 24.

The number of protruding structures 224, which is 8 in this embodiment, may vary according to actual requirement. The two protruding structures 224 are disposed at intervals along the circumference of the lateral side of the main body 223, and the limiting portion 222 is formed at the gap between the protruding structures 224. The limiting portion 222 is preferably open at both ends. Definitely, the limiting portion 222 is not limited to the structure provided in this embodiment during implementation, and may vary according to requirements.

Optionally, when more than two protruding structures 224 are shown in the figure, one or more through portions 225 with both ends in communication with air may further be formed between the protruding structures 224, to serve as a cooling air flow passage. The through portion 225 is penetrated vertically, thereby enhancing vertical convection of hot air and cooling air, and enhancing the heat dissipation. It should be noted that, the through portion 225 may also be formed by the hollow interior of the protruding structure 224, and is not limited to what is shown in the figure.

Optionally, to further enhance the heat dissipation, wrinkles are formed on at least a part of the outer surface of the light source mounting member 22, thereby increasing the cooling area.

The lens member 23 is used for covering the bearing surface of the light source mounting member 22, which carries the light source electronic component 24. The lens member 23 is used for controlling distribution of light emitted from the light source electronic component 24. Optionally, in order to provide sealing protection for the light source electronic component 24, a seal ring 26 is disposed between the lens member 23 and the light source mounting member 22. The seal ring 26 is used for seal the light source electronic component 24 between the lens member 23 and the light source mounting member 22 from the external environment, thereby achieving dust-proof and water-proof The support member 21 and the lens member 23 may be connected in a positioned manner, so as to clamp and longitudinally position the light source mounting member 22 therebetween, thereby fixing the position of the light source mounting member 22.

In this embodiment, the positioning connection is a clamping connection; in other embodiments, the positioning connection may be an adhesion connection or other connections. The clamping connection can achieve a detachable connection between the support member 21 and the lens member 23.

In the embodiments shown in FIG. 3 and FIG. 4, the clamping connection is implemented by clamping between the first clamping portion 213 disposed on the support member 21 and the second clamping portion 231 disposed on the lens member 23.

In this embodiment, the lens member 23 is provided with a second extension portion 232, which is jointed with the limiting portion 222, the second clamping portion 232 is disposed on the second extension portion 232. The first extension portion 212 and the second extension portion 232 are each jointed with a part of the limiting portion 222. For example, in this embodiment, the first extension portion 212 extends into the limiting portion 222 from one end, and the second extension portion 232 extends into the limiting portion 222 from the other end, so that relative positions of the lens member 23, the light source mounting member 22, and the support member 21 are all fixed transversely. In addition, the lens member 23, the light source mounting member 22, and the support member 21 are longitudinally positioned by means of the clamping between the first clamping portion 213 and the second clamping portion 231, thereby having a fixed relative position relationship.

In this embodiment, the first clamping portion 213 includes: a hook portion 2131 located on the circumference of the support member 21 and protruding outwards; and a stopping portion 2132 disposed opposite to the hook portion 2131. The second clamping portion 231 is a buckle portion.

A gap 2133 is formed between the hook portion 2131 and the stopping portion 2132, so that the second clamping portion 231, that is, the buckle portion, is inserted into the gap and clamped with the hook portion 2131. Optionally, the hook portion 2131 has a guide surface A (such as an inclined surface or a cambered surface) inclined towards the interior of the gap 2133. The stopping portion 2132 and/or the hook portion 2131 may be elastically deformable or is flexible so that the gap has an adjustable width. The opening of the gap 2133 may be wide enough, so that the second clamping portion 231 of the lens member 23 enters the gap (for example, the guide surface A of the hook portion is extruded to be elastically deformed, thereby expanding the opening of the gap 2132). The width of the gap is reduced to be less than the width of the second clamping portion 231 after the second clamping portion 231 enters, so as to limit the second clamping portion 231 within the gap through the hook portion.

In conclusion, the lighting device according to this disclosure includes: a bearing member, provided with a circuit switching component for connection to an external power supply, where the circuit switching component is provided with at least one first plug portion; and at least one light source component. The at least one light source component includes: a housing, on which a first accommodation portion and a second accommodation portion are formed; one or more light source units, disposed in the first accommodation portion, each light source unit having one or more pairs of power supply pins; a drive circuit component, disposed in the second accommodation portion and including: a second plug portion for positioning with the first plug portion and plugging with the first plug portion in a conductive connection manner, the drive circuit component being used for switching the external power supply to supply power to the light source unit; and a conductive member, provided with through holes for inserting the power supply pins, and capable of being in conductive contact with each electrical connection pin, the conductive member being capable of being conductively connected to the drive circuit component so as to be conductively connected to the second plug portion through the drive circuit component. The lighting device according to this disclosure can be used as a plant growth lamp. The light source units are independent of each other, and in the case of damage, each light source unit can be replaced individually.

The foregoing embodiments are only used to illustrate the principle and efficacy of this disclosure exemplarily, and are not intended to limit this disclosure. Any person skilled in the art can make modifications or variations on the foregoing embodiments without departing from the spirit and scope of this disclosure. Accordingly, all equivalent modifications or variations completed by those with common knowledge in the art without departing from the spirit and technical thinking disclosed by this disclosure should fall within the scope of the claims of this disclosure.

What is claimed is:

1. A lighting device, comprising:
   a bearing member, provided with a circuit switching component, wherein the circuit switching component is connected to an external power supply, and is provided with at least one first plug portion; and
   at least one light source component, comprising:
   a housing, provided with a first accommodation portion and a second accommodation portion;
   one or more light source units, disposed in the first accommodation portion, wherein each light source unit has one or more pairs of power supply pins;
   a drive circuit component, disposed in the second accommodation portion and comprising a second plug portion, wherein the second plug portion is positioned with the first plug portion, the drive circuit component is used for switching the external power supply into supply power to the light source unit; and
   a conductive member, provided with through holes for inserting the power supply pins, wherein the conductive member is in conductive contact with each electrical connection pin, the conductive member is conductively connected to the drive circuit component so as to conductively connect to the second plug portion through the drive circuit component,
   wherein the circuit switching component is provided with a plurality of first plug portions along a length direction, and the plurality of first plug portions is plugged in second plug portions of the plurality of light source components respectively.

2. The lighting device as in claim 1, comprising at least one screw locking member, wherein the screw locking member passes through at least one positioning hole provided in the housing.

3. The lighting device as in claim 1, wherein a third accommodation portion jointed with the conductive member through shape matching is formed in the housing.

4. The lighting device as in claim 1, wherein the lighting device is a plant growth lamp.

5. The lighting device as in claim 1, wherein the length direction of the bearing member is the same as that of the circuit switching component, and a fourth accommodation portion jointed with the circuit switching component through shape matching is disposed in the bearing member.

6. The lighting device as in claim 1, wherein the bearing member is provided with one or more suspending levers, or one or more pairs of suspending levers for suspension.

7. The lighting device as in claim 1, wherein the light source unit comprises:
   a support member, provided with a first positioning portion, wherein the lighting device is disposed on the support member;
   a light source mounting member, provided with a second positioning portion, wherein the second positioning portion is jointed with the first positioning portion through shape matching, the light source mounting member has a bearing surface for disposing a light source electronic component; and
   a lens member, covering the bearing surface and connected to the support member in a positioned manner.

8. The lighting device as in claim 7, comprising one or more pairs of power supply pins, wherein one end of each power supply pin is electrically connected to the light source electronic component, and the other end is exposed after passing through the support member and the light source mounting member.

9. The lighting device as in claim 7, wherein the support member is provided with at least one first extension portion, wherein the at least one first extension portion surround the first positioning portion, and extends towards the lens member, the light source mounting member is provided with at least one limiting portion, which is correspondingly jointed with the at least one first extension portion in a one-to-one manner.

10. The lighting device as in claim 9, wherein the first extension portion is a convex body extending towards the lens member, and the limiting portion is a groove located on an outer surface of the light source mounting member and fitting with the convex body.

11. The lighting device as in claim 9, wherein the light source mounting member comprises:
   a main body; and
   at least two protruding structures disposed at intervals along the circumference of a lateral side of the main body, wherein the limiting portion is formed at a gap between the protruding structures.

12. The lighting device as in claim 7, wherein the lens member is provided with a second extension portion jointed with the limiting portion, the first extension portion and the second extension portion are each jointed with a part of the limiting portion.

13. The lighting device as in claim 7, wherein the positioning connection is a clamping connection; the support member is provided with a first clamping portion; and the lens member is provided with a second clamping portion clamped with the first clamping portion.

14. The lighting device as in claim 13, wherein the first clamping portion is disposed at the first extension portion, and the second clamping portion is disposed at the second extension portion.

15. The lighting device as in claim 13, wherein the first clamping portion is a hook portion, the second clamping portion is a buckle portion, or the first clamping portion is a buckle portion,, the second clamping portion is a hook portion..

16. The lighting device as in claim 15, wherein clamping between the first clamping portion and the second clamping portion is one of the following:
  1) the first clamping portion is a hook portion located on the circumference of the support member and protruding outwards to clamp with the second clamping portion on an external side thereof; and
  2) the first clamping portion comprises a hook portion located on the circumference of the support member and protruding inwards, and a stopping portion disposed opposite to the hook portion, wherein a gap is formed between the hook portion and the stopping portion for the buckle portion to insert and clamp with the hook portion; and the gap has an adjustable width to limit the buckle portion within the gap.

17. The lighting device as in claim 12, wherein the positioning connection is a clamping connection; the support member is provided with a first clamping portion; and the lens member is provided with a second clamping portion clamped with the first clamping portion.

\* \* \* \* \*